United States Patent [19]

Limberg et al.

[11] Patent Number: 4,665,973
[45] Date of Patent: May 19, 1987

[54] ENVIRONMENTAL CONTROL SYSTEM

[75] Inventors: Gilbert E. Limberg, Rancho Palos Verdes; Robert C. Kinsell, Los Angeles, both of Calif.

[73] Assignee: The Garrett Corporation, Los Angeles, Calif.

[21] Appl. No.: 684,660

[22] Filed: Dec. 21, 1984

[51] Int. Cl.⁴ .............................................. F28F 13/18
[52] U.S. Cl. ..................................... 165/133; 62/402; 244/118.5
[58] Field of Search .......................... 62/402; 165/133; 244/118.5; 98/1.5

[56] References Cited

U.S. PATENT DOCUMENTS

| | | | |
|---|---|---|---|
| 2,298,607 | 10/1942 | Anderson | 23/4 |
| 2,477,932 | 8/1949 | King | 244/118.5 X |
| 2,778,610 | 1/1957 | Bruegger | 165/133 |
| 2,898,201 | 8/1959 | Hayes | 23/288 |
| 2,905,523 | 9/1959 | Houdry et al. | 23/2 |
| 2,980,494 | 4/1961 | Jenkins et al. | 23/4 |
| 2,988,432 | 6/1961 | Long | 23/288 |
| 2,992,542 | 7/1961 | Arthur | 62/402 X |
| 3,222,883 | 12/1965 | Glaspie | 62/402 X |
| 3,269,802 | 8/1966 | Boberg et al. | 23/288 |
| 3,404,538 | 10/1968 | Kinsell | 62/402 X |
| 3,654,432 | 4/1972 | Dyre | 165/133 X |
| 3,819,334 | 6/1974 | Yoshida et al. | 165/133 X |
| 4,173,549 | 11/1979 | Kent et al. | 252/463 |
| 4,184,983 | 1/1980 | Putz et al. | 252/466 P X |
| 4,200,609 | 4/1980 | Byrd | 422/122 |
| 4,206,083 | 6/1980 | Chang | 252/455 R |
| 4,207,291 | 6/1980 | Byrd et al. | 422/122 |
| 4,374,469 | 2/1983 | Rannenberg | 62/402 |
| 4,405,507 | 9/1983 | Carr et al. | 252/466 B |

FOREIGN PATENT DOCUMENTS

| | | | |
|---|---|---|---|
| 1124072 | 5/1982 | Canada | 244/118.5 |
| 2027874A | 2/1980 | United Kingdom | 244/118.5 |
| 2076897A | 12/1981 | United Kingdom | 244/118.5 |
| 723303 | 3/1980 | U.S.S.R. | 165/7 |

*Primary Examiner*—Sheldon J. Richter
*Assistant Examiner*—Randolph A. Smith
*Attorney, Agent, or Firm*—James W. McFarland; Albert J. Miller

[57] ABSTRACT

An environmental control system having an ozone decomposition catalyst coating in the hot pass side of the primary heat exchanger. The environmental control system includes primary and secondary heat exchangers as well as a rotary compressor and a rotary turbine expander. The environmental control system is used in aircraft for providing conditioned air to the habitable space of the aircraft for life support purposes.

2 Claims, 2 Drawing Figures

ENVIRONMENTAL CONTROL SYSTEM

BACKGROUND OF THE INVENTION

This invention pertains to environmental controls systems and more particularly to such controls systems for providing conditioned air to the cabin within an aircraft.

Environmental control systems for aircraft and other vehicles are utilized to provide a conditioned airflow for passenger and crew within the aircraft. The environmental control system typically receives a flow of compressed, warm air from a pressurized air source on the aircraft, and cools, dehumidifies and removes certain deleterious contaminants from the airflow. Weight, economy, and ruggedness of operation are important criteria in such systems. Particularly in aircraft, one function of the environmental system is to remove or reduce the amount of ozone contained within the airflow. It is important therefore, that such ozone removal be accomplished while minimizing the additional weight and/or space required to accomplish this function.

SUMMARY OF THE INVENTION

Accordingly, it is an important object of the present invention to provide in an environmental control system of the class described, method and apparatus for removing or reducing the ozone content within the airflow while minimizing weight and space penalties upon the environmental control system.

Briefly, this is accomplished in the present invention by incorporating an ozone decomposition catalyst directly upon the heat exchange surfaces of one or more of the heat exchangers utilized in the environmental control system. For maximum system efficiency, the ozone decomposition catalyst is coated on the first heat exchanger of the environmental control system which receives the airflow in it warmest state.

These and other objects and advantages of the present invention are specifically set forth in or will become apparent from the following detailed description of a preferred form of the invention when read in conjunction with the accompanying drawing.

DETAILED DESCRIPTION OF THE INVENTION

Figure 1:
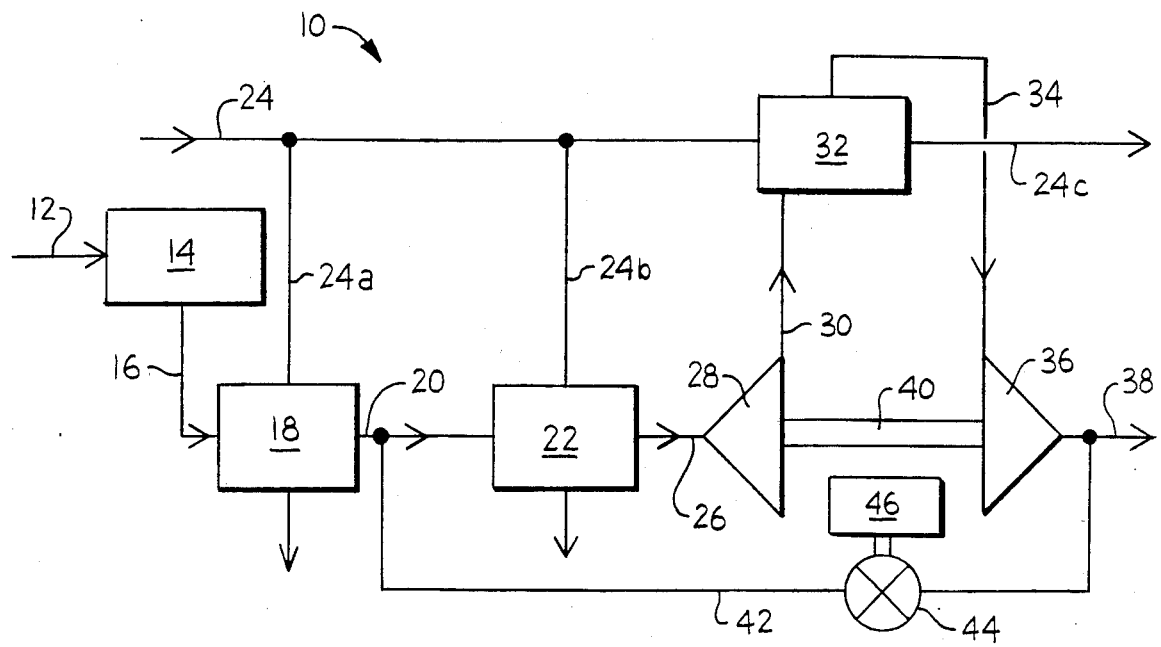
FIG. 1 is a schematic of an environmental control system constructed in accordance with the principles of the present invention.

Referring now more particularly to the drawing, an environmental control system denoted by the numeral 10 may be of the type utilized in aircraft, tanks or other vehicles. The vehicle (not shown) receives ambient air from an inlet 12 to a compressed air source 14 which may be the engine on the vehicle. The environmental control system 10 receives a pressurized, relatively warm airflow from the engine via an inlet passage or duct 16 which directs the incoming warm airflow to the hot pass side of a primary heat exchanger 18. To cool relatively warm airflow, the primary heat exchanger 18 has a heat sink in the form of a relatively cool airflow (such as ambient air in the instance of an aircraft) received from a cooling fluid passage 24 and subpassage 24a associated therewith.

After the cooling interchange with the heat sink airflow in the primary heat exchanger 18, the airflow is directed through a first passage 20 to a second heat exchanger 22. Similar to the primary heat exchanger, the heat exchanger 22 also receives a cooling airflow from passage 24 and subpassage 24b. The exhaust of the cooler airflow from second heat exchanger 22 passes through a second passage 26 to the inlet of a compressor of a rotary compressor 28. Pressurized airflow is exhausted from compressor 28 through a third passage 30 to a third heat exchanger 32. Again, the third heat exchanger 32 receives a heat sink flow of cooling flow from passage 24 which is ultimately exhausted to subpassage 24c. Heat exchanger 32 operates to remove all or at least a portion of the heat of compression in the airflow introduced by compressor 28. The exhaust of airflow from heat exchanger 32 passes through a fourth passage 34 to the inlet of a rotary turbine expander 36.

Rotary turbine expander 36 is driven by the airflow from passage 34 to expand and significantly cool the airflow therethrough prior to its exhaust through an outlet passage 38 from whence it is ultimately directed to the cabin of the aircraft. The rotary turbine 36 is connected via a shaft 40 to directly drive the compressor 28 in known bootstrap fashion.

For control of the temperature of the airflow exiting outlet passage 38, there is included a temperature bypass passage 42 extending from first passage 20 to outlet passage 38. A control valve 44 controls the volume of relatively warm airflow in the temperature control passage 42 under the urgings of a control system 46. The volume of flow permitted through the temperature control passage 42 will ultimately determine the temperature of air being delivered through outlet passage 38 to the cabin.

Various other heat exchangers, dehumidifiers, water traps, condensers, and/or other elements may be incorporated in the environmental control system 10.

Figure 2:
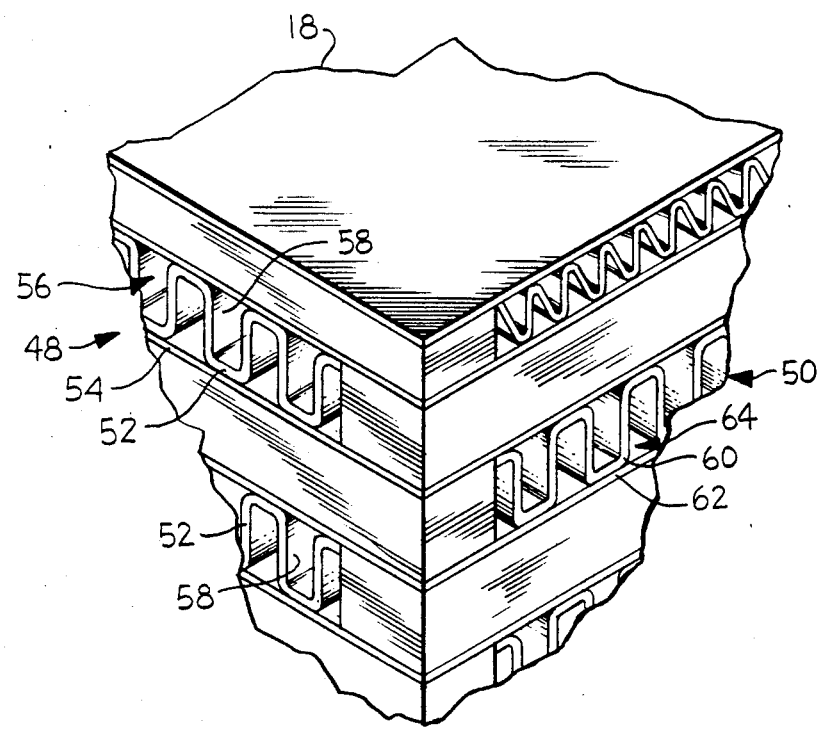
FIG. 2 is a partial, perspective view of the core of the heat exchanger 18.

Internal details are construction of the core of primary heat exchanger 18 are illustrated in FIG. 2. More particularly, the core of primary heat exchanger 18 is of the plate-fin construction with crossflow of the warm and cool fluids being passed therethrough. Specifically, heat exchanger 18 incorporates a hot pass side 48 which receives the relatively warm airflow from inlet duct 16. A cool pass side 50 receives the relatively cool fluid flow from subpassage 24a.

Hot pass side 48, being of plate fin construction, includes a plurality of rows of fin elements 52 sandwiched between plate elements 54 on the top and bottom thereof to define a plurality of hot pass passages 56 therebetween through which the airflow from inlet duct 16 passes. The cool pass side 50 of the heat exchanger similarly includes a plurality of fin elements 60 between associated plate elements 62 to define a plurality of cool pass passages 64 through which the cooling fluid from subpassage 24a passes. As will be evident from FIG. 2 the hot pass fin elements 52 and cool pass elements 60 are sandwiched between one another and arranged in crossflow configuration such that the fluid flowing through the hot pass passages 56 is at right angles to the fluid flowing through cool pass passages 64.

Upon the surfaces of the fin elements 52 and plate elements 54 of the hot pass side which are exposed to the hot pass passages 56, is a coating 58 for decomposing ozone in the relatively warm airflow. An example of ozone decomposition catalyst for the coating 58 is one including platinum and a base metal. Such catalyst materials are well known in the art and are discussed generally in various references such as U.S. Pat. Nos. 4,405,507, 4,206,083; and 4,173,549. When deposited upon the surfaces of elements 52, 54, which are preferably of a metallic material conducive to heat transfer such as inconel, steel, or aluminum including alloys thereof, the coating 58 is sufficient in amount and deposited over sufficient surface area to effectively decompose the ozone in the warm airflow which is on the order of about 100 to 150 degrees F. or more. At the same time, however, it has been found that the coating 58 does not alter the heat exchange function and operation beyond acceptable limits.

In operation, the relatively warm airflow from inlet duct 56 passes the hot pass passages 56 to accomplish first stage cooling of the airflow. At the same time the ozone composition catalyst 58 operates to decompose, reduce and/or eliminate the ozone in the airflow. Preferably the ozone decomposition catalyst 58 is included in the precooler or primary heat exchanger 18 which carries the conditioned airflow in its warmest state, inasmuch as the efficiency of the ozone decomposition catalyst is improved with higher temperatures. Thus ozone decomposition is accomplished without adding any space requirements to the environmental control system, and with minimum weight addition, i.e., only the weight of the ozone catalyst per se is added to the system.

Various alterations and modifications to the present invention will be apparent to those skilled in the art. Accordingly, the foregoing detailed description should be considered exemplary in nature and not as limiting to the scope and spirit of the invention as set forth in the accompanying claims.

Having described the invention with sufficient that those skilled in the art may make and use it, what is claimed is:

1. In a vehicular environmental control system for conditioning a relative warm airflow for subsequent delivery to a habitable space within the vehicle:
   an inlet duct for receiving the relatively warm airflow;
   a primary heat exchanger having a hot pass core and a cool pass core, each of said cores comprising a plurality of elements respectively defining hot pass and cool pass passageways, said elements of said hot pass and cool pass cores being in heat exchange relationship, said heat exchanger arranged such that the relatively warm airflow from said inlet duct passes through said hot pass passageways, said heat exchanger adapted to receive a flow of relatively cool fluid flow through said cool pass passageways;
   an ozone decomposition catalyst coating on the surfaces of said elements of the hot pass core exposed to said hot pass passageways, said coating effective to decompose ozone in said warm airflow;
   a rotary compressor disposed to receive airflow exhausted from said hot pass passageways of the heat exchanger and operable to compress the airflow;
   a rotary turbine expander driven by the compressed airflow for expanding and cooling the compressed airflow, said turbine operably coupled to drive said compressor; and
   a secondary heat exchanger disposed between said compressor and said turbine for removing at least a portion of the heat of compression in the airflow, said secondary heat exchanger adapted to receive a flow of cooling fluid to provide a heat sink for removal of said portion of heat.

2. In an aircraft fluid conditioning system adapted to condition a relatively warm airflow for subsequent delivery to the aircraft cabin:
   an inlet passage for receiving a relatively warm airflow from a pressurized air source on said aircraft;
   a primary heat exchanger having a hot pass core and a cool pass core, each of said cores comprising a plurality of elements respectively defining hot pass and cool pass passageways, said elements of said hot pass and cool pass cores being in heat exchange relationship, said heat exchanger arranged such that the relatively warm airflow from said inlet duct passes through said hot pass passageways, said heat exchanger adapted to receive a flow of relatively cool fluid flow through said cool pass passageways;
   an ozone decomposition catalyst coating on the surfaces of said elements of the hot pass core exposed to said hot pass passageways, said coating effective to decompose ozone in said warm airflow;
   a first passage for carrying airflow exhausted from said hot pass passageways;
   a second heat exchanger receiving airflow from said first passage and adapted to receive a flow of cooling fluid in heat exchange, nonmixing relationship with the airflow to further cool the airflow;
   a second passage for carrying airflow exhausted from said second heat exchanger;
   a rotary compressor receiving airflow from said second passage for compressing the airflow;
   a third passage for carrying compressed airflow exhausted from said compressor;
   a third heat exchanger receiving airflow from said third passage and adapted to receive a flow of cooling fluid in heat exchange, nonmixing relationship with the airflow to remove at least a portion of the heat of compression therein;
   a fourth passage for carrying airflow exhausted from said third heat exchanger;
   a rotary turbine driven by airflow received from said fourth passage, said turbine operable to expand and cool the airflow;
   a shaft operably connecting said turbine in driving relationship with said compressor;
   an outlet passage for carrying airflow exhausted from said turbine toward said aircraft cabin;
   a temperature control passage extending from said second passage to said outlet passage; and
   a temperature control valve for controlling airflow through said temperature control passage.

* * * * *